(12) United States Patent
Choi et al.

(10) Patent No.: US 12,132,163 B2
(45) Date of Patent: Oct. 29, 2024

(54) METHOD FOR MANUFACTURING SECONDARY BATTERY AND SECONDARY BATTERY

(71) Applicant: LG Energy Solution, Ltd., Seoul (KR)

(72) Inventors: Soon Ju Choi, Daejeon (KR); Eun Ju Lee, Daejeon (KR); Seok Koo Kim, Daejeon (KR); Ji Eun Lee, Daejeon (KR); Ji Hoon Ryu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/761,746

(22) PCT Filed: Sep. 17, 2020

(86) PCT No.: PCT/KR2020/012526
§ 371 (c)(1),
(2) Date: Mar. 18, 2022

(87) PCT Pub. No.: WO2021/060770
PCT Pub. Date: Apr. 1, 2021

(65) Prior Publication Data
US 2022/0344696 A1 Oct. 27, 2022

(30) Foreign Application Priority Data
Sep. 23, 2019 (KR) .................. 10-2019-0117066

(51) Int. Cl.
*H01M 10/04* (2006.01)
*H01M 10/0583* (2010.01)
(Continued)

(52) U.S. Cl.
CPC ..... *H01M 10/049* (2013.01); *H01M 10/0583* (2013.01); *H01M 10/446* (2013.01); *H01M 50/317* (2021.01); *H01M 50/46* (2021.01)

(58) Field of Classification Search
None
See application file for complete search history.

(56) References Cited

U.S. PATENT DOCUMENTS 5,362,577 A * 11/1994 Pedicini .............. H01M 50/394
429/86
5,486,429 A 1/1996 Thibault
(Continued)

FOREIGN PATENT DOCUMENTS

CN 103354961 A 10/2013
CN 205542919 U 8/2016
(Continued)

OTHER PUBLICATIONS

KR20150061996—macine translation (Year: 2015).*
(Continued)

*Primary Examiner* — Haroon S. Sheikh
(74) *Attorney, Agent, or Firm* — Lerner David LLP

(57) ABSTRACT

The present invention relates to a method for manufacturing a secondary battery and a secondary battery. The method for manufacturing the secondary battery comprises an accommodation step of accommodating an electrode assembly in an accommodation part of a battery case, a vent membrane mounting step of mounting a vent membrane on a discharge hole, which passes between the inside and outside of the battery case, in the battery case, and a case sealing step of sealing the battery case, wherein the vent membrane allows only a gas to pass through the discharge hole of the battery case, but blocks a liquid.

10 Claims, 10 Drawing Sheets

(51) Int. Cl.
*H01M 10/44* (2006.01)
*H01M 50/317* (2021.01)
*H01M 50/46* (2021.01)

(56) References Cited

U.S. PATENT DOCUMENTS

| | | | | |
|---|---|---|---|---|
| 5,506,067 | A * | 4/1996 | Tinker | H01M 50/394 |
| | | | | 429/86 |
| 6,949,310 | B2 * | 9/2005 | Phillips | H01M 50/325 |
| | | | | 429/82 |
| 2002/0182482 | A1 * | 12/2002 | Hockaday | H01M 50/30 |
| | | | | 429/57 |
| 2004/0028995 | A1 * | 2/2004 | Shelekhin | H01M 50/103 |
| | | | | 429/162 |
| 2010/0239895 | A1 | 9/2010 | Yang et al. | |
| 2011/0027645 | A1 * | 2/2011 | Komatsuki | H01M 50/198 |
| | | | | 429/185 |
| 2012/0015218 | A1 | 1/2012 | Lee | |
| 2012/0028089 | A1 * | 2/2012 | Mustakallio | H01M 50/24 |
| | | | | 29/623.2 |
| 2013/0208405 | A1 | 8/2013 | Okada et al. | |
| 2013/0244095 | A1 | 9/2013 | Min et al. | |
| 2014/0120387 | A1 * | 5/2014 | Kinuta | H01M 50/333 |
| | | | | 429/54 |
| 2016/0156007 | A1 | 6/2016 | Hah et al. | |
| 2019/0267593 | A1 | 8/2019 | Do et al. | |
| 2020/0266423 | A1 * | 8/2020 | Kitagawa | H01M 50/46 |

FOREIGN PATENT DOCUMENTS

| | | | |
|---|---|---|---|
| CN | 205645893 | U | 10/2016 |
| CN | 207009526 | U | 2/2018 |
| CN | 208781910 | U | 4/2019 |
| DE | 102010044715 | A1 | 5/2011 |
| EP | 2945214 | A1 | 11/2015 |
| JP | 2013196851 | A | 9/2013 |
| JP | 2016152231 | A | 8/2016 |
| JP | 2019029406 | A | 2/2019 |
| KR | 20080019551 | A | 3/2008 |
| KR | 20110030165 | A | 3/2011 |
| KR | 20110082975 | A | 7/2011 |
| KR | 20140015647 | A | 2/2014 |
| KR | 20140129601 | A | 11/2014 |
| KR | 20150034498 | A | 4/2015 |
| KR | 20150055775 | A | 5/2015 |
| KR | 20150061996 | A * | 6/2015 |
| KR | 20160134164 | A | 11/2016 |
| KR | 20170022580 | A | 3/2017 |
| KR | 20170043926 | A | 4/2017 |
| KR | 20170132565 | A | 12/2017 |
| KR | 20180061665 | A | 6/2018 |
| KR | 20190007710 | A | 1/2019 |
| KR | 20190022196 | A | 3/2019 |
| KR | 20190042215 | A | 4/2019 |

OTHER PUBLICATIONS

International Search Report for Application No. PCT/KR2020/012526 mailed Jan. 6, 2021, 2 pages.
Extended European Search Report including Written Opinion for Application No. 20870027.8 dated Jun. 25, 24. 9 pgs.

* cited by examiner

METHOD FOR MANUFACTURING SECONDARY BATTERY AND SECONDARY BATTERY

CROSS-REFERENCE TO RELATED APPLICATION

This application is a national phase entry under 35 U.S.C. § 371 of International Application No. PCT/KR2020/012526, filed on Sep. 17, 2020, which claims priority to Korean Patent Application No. 10-2019-0117066, filed on Sep. 23, 2019 with the Korean Intellectual Property Office, the entire contents of which are hereby incorporated herein by reference.

TECHNICAL FIELD

The present invention relates to a method for manufacturing a secondary battery and a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

The secondary battery is manufactured by accommodating an electrode assembly in a pouch. Here, there is a problem in that unnecessary external moisture and air are introduced into the secondary battery during the manufacturing process, resulting in performance degradation and a risk of explosion. Also, even after the manufacturing, there has been a risk of explosion of the secondary battery when an excessive internal gas is generated.

PRIOR ART DOCUMENTS (Patent Documents) Korean Patent Publication No. 10-2014-0015647

DISCLOSURE OF THE INVENTION

Technical Problem

One aspect of the present invention is to provide a method for manufacturing a secondary battery, which is capable of preventing unnecessary external moisture and air from being introduced into the secondary battery during or after process of manufacturing the secondary battery, and a secondary battery.

Technical Solution

A method for manufacturing a secondary battery comprises: an accommodation step of accommodating an electrode assembly in an accommodation part of a battery case; a vent membrane mounting step of mounting a vent membrane on a discharge hole, which passes between the inside and outside of the battery case, in the battery case; and a case sealing step of sealing the battery case, wherein the vent membrane allows only a gas to pass through the discharge hole of the battery case, but blocks a liquid.

A secondary battery comprises: an electrode assembly in which electrodes and separators are alternately stacked to be assembled; a battery case, which has an accommodation part, in which the electrode assembly is accommodated, therein and in which a discharge hole passing between the inside and outside of the battery case is formed; and a vent membrane mounted on the discharge hole of the battery case to allow only a gas to pass through the through the discharge hole, but block a liquid.

Advantageous Effects

According to the present invention, the vent membrane may be mounted on the discharge hole passing between the inside and outside of the battery case so that only a gas passes through the discharge hole, but a liquid is blocked. Therefore, the external foreign substances may be prevented from being introduced into the secondary battery while the internal gas generated during or after the process of manufacturing the secondary battery is easily discharged to the outside.

Also, the vent membrane may be mounted during the de-gassing process, which corresponds to the latter half of the process of manufacturing the secondary battery, to prevent the vent membrane from being physically and chemically damaged during the process of manufacturing the secondary battery. Therefore, the vent membrane may be prevented from being deteriorated in function, and also, the deteriorate of the battery performance due to the introduction of the large amount of external air and moisture into the secondary battery through the damaged portions, the risk of the explosion, and the occurrence of the defects may be prevented or significantly reduced.

MODE FOR CARRYING OUT THE INVENTION

Figure 1:
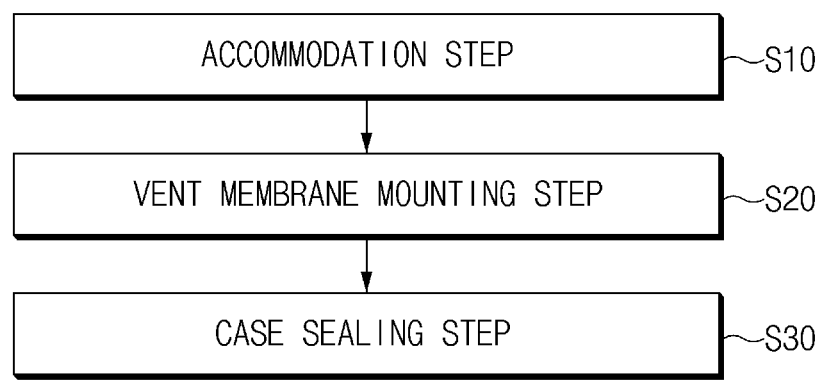
FIG. 1 is a flowchart illustrating a method for manufacturing a secondary battery according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
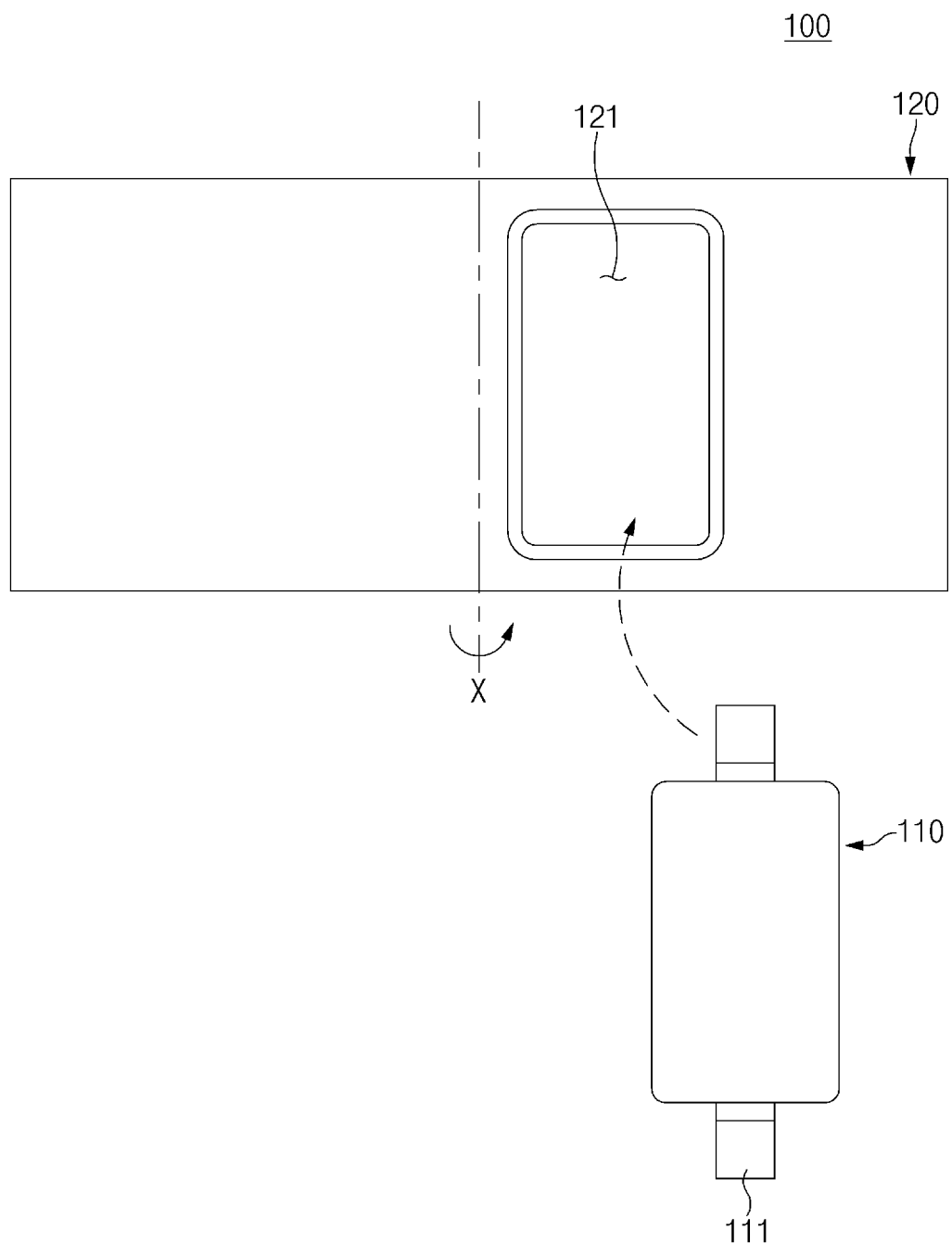
FIG. 2 is a plan view illustrating a state before an electrode assembly is accommodated in an accommodation step in a method for manufacturing a secondary battery according to a first embodiment of the present invention.
Figure 3:
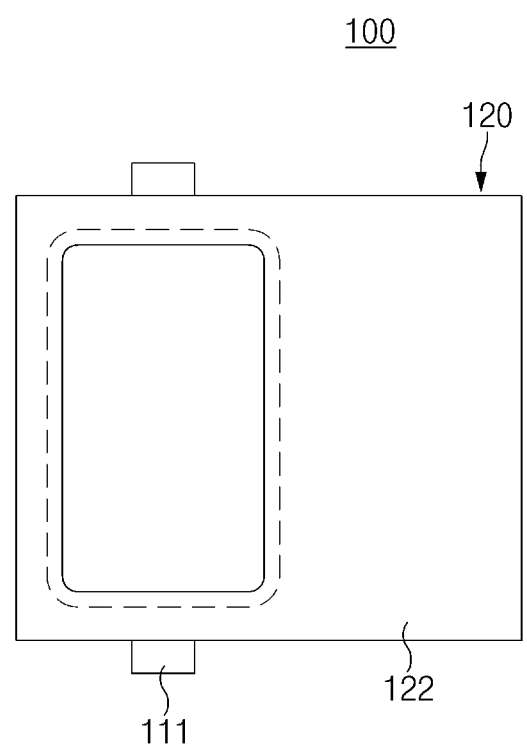
FIG. 3 is a plan view illustrating a state in which the electrode assembly is accommodated in the accommodation step in the method for manufacturing the secondary battery according to the first embodiment of the present invention.

FIG. 1 is a flowchart illustrating a method for manufacturing a secondary battery according to an embodiment of the present invention, FIG. 2 is a plan view illustrating a state before the electrode assembly is accommodated in an accommodation step in a method for manufacturing a secondary battery according to a first embodiment of the present invention, and FIG. 3 is a plan view illustrating a state in which the electrode assembly is accommodated in the accommodation step in the method for manufacturing the secondary battery according to the first embodiment of the present invention.

Figure 4:
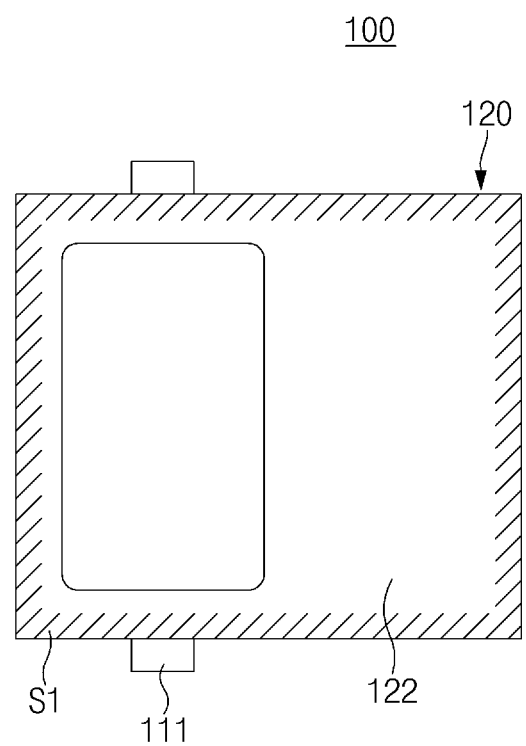
FIG. 4 is a plan view illustrating a sealing step in the method for manufacturing the secondary battery according to the first embodiment of the present invention.
Figure 5:
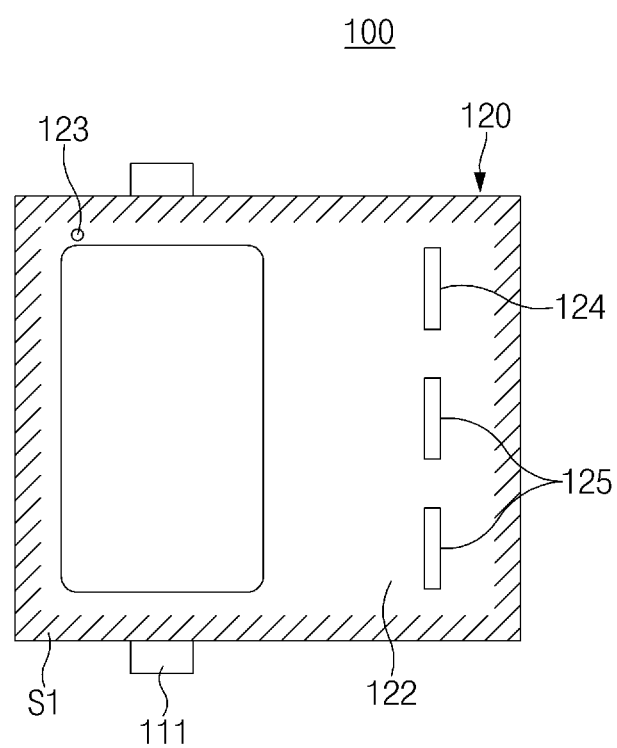
FIG. 5 is a plan view illustrating a process of forming an insertion hole in a vent membrane mounting step in the method for manufacturing the secondary battery according to the first embodiment of the present invention.
Figure 6:
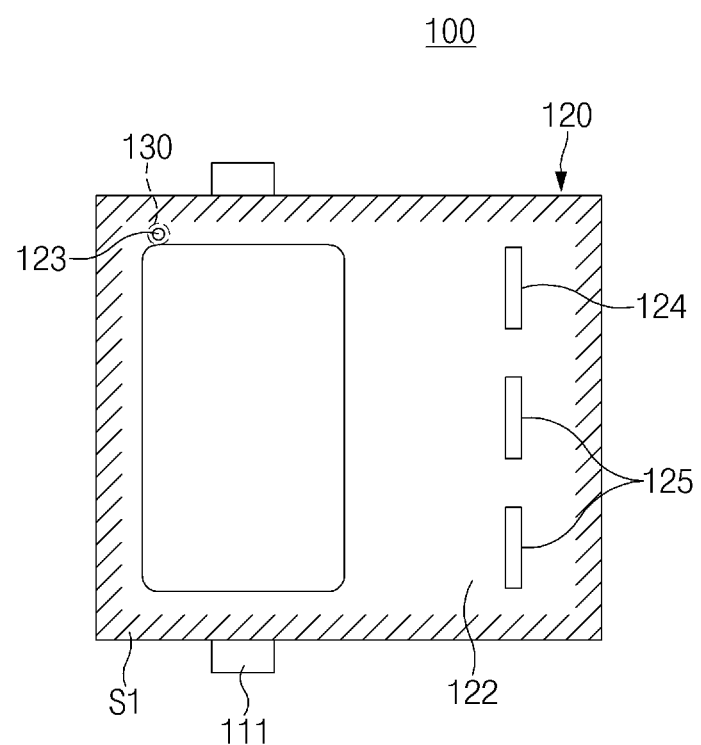
FIG. 6 is a plan view illustrating a state in which the vent membrane is disposed in the vent membrane mounting step in the method for manufacturing the secondary battery according to the first embodiment of the present invention.

In addition, FIG. 4 is a plan view illustrating a sealing step in the method for manufacturing the secondary battery according to the first embodiment of the present invention, FIG. 5 is a plan view illustrating a process of forming an insertion hole in a vent membrane mounting step in the method for manufacturing the secondary battery according to the first embodiment of the present invention, and FIG. 6 is a plan view illustrating a state in which the vent membrane is disposed in the vent membrane mounting step in the method for manufacturing the secondary battery according to the first embodiment of the present invention.

Referring to FIGS. 1 to 6, a method for manufacturing a secondary battery according to a first embodiment of the present invention may comprise an accommodation step (S10) of accommodating an electrode assembly 110 in a battery case 120, a vent membrane mounting step (S20) of mounting a vent membrane 130 on a discharge hole 123 in the battery case 120, and a case sealing step (S30) of sealing the battery case 120 to manufacture a secondary battery 100.

Also, the method for manufacturing the secondary battery according to the first embodiment of the present invention may further comprise an activation step of activating the electrode assembly 110 before the vent membrane mounting step (S20) after the accommodation step (S10) and a de-gassing step of discharging an internal gas to the outside of the battery case 120.

Furthermore, the method for manufacturing the secondary battery according to the first embodiment of the present invention may further comprise a sealing step of sealing an outer circumferential surface of the battery case 120 before the vent membrane mounting step (S20).

In more detail, referring to FIGS. 1 to 3, in the accommodation step S10, the electrode assembly 110 may be accommodated in an accommodation part 121 of the battery case 120.

Here, the battery case 120 may comprise the accommodation part 121, in which the electrode assembly 110 is accommodated, and a gas pocket part 122 connected to the accommodation part 121 to collect a gas generated in the accommodation part 121.

Here, in the accommodation step (S10), after the electrode assembly 110 is accommodated in the accommodation part 121 formed in the battery case 120 having a sheet shape, the battery case 120 may be folded along a virtual line X to cover the accommodation part 121.

Here, the battery case 120 may comprise an upper case 126 and a lower case 127.

The electrode assembly 110 may be a chargeable and dischargeable power generation element and have a shape in which an electrode and a separator are alternately stacked to be assembled with each other.

Also, the electrode assembly 110 may further comprise an electrode lead 111 connected to an end of the electrode. Here, the electrode assembly 110 may be electrically connected to an external device through the electrode lead 111.

In the sealing step, the outer circumferential surface of the battery case 120 may be sealed before the vent membrane mounting step (S20) after the accommodation step (S10). Here, the sealing step may be performed, for example, before the activation step.

Also, in the sealing step, the outer circumferential surface of the battery case 120 in four directions may be sealed to form an initial sealing part S1.

In the activation step, electricity may be applied to the electrode assembly 110 to activate the electrode assembly through charging and discharging. Here, the secondary battery 100 may be activated through the activation step.

In the de-gassing step, the internal gas generated through the activation step may be discharged to the outside of the battery case 120.

In the degassing step, for example, a de-gassing hole 125 may be formed in the battery case 120 to discharge the internal gas to the outside of the battery case 120 through the de-gassing hole 125. Here, the degassing hole 125 may be formed in the gas pocket part 122 in the battery case 120.

Figure 7:
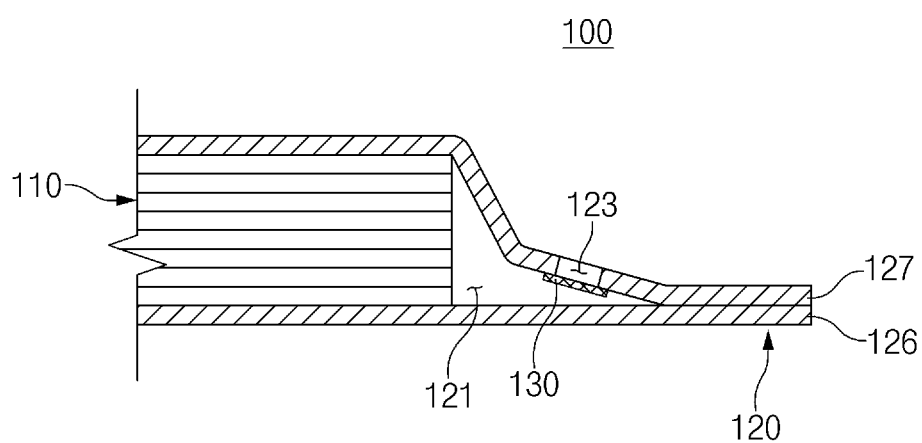
FIG. 7 is a cross-sectional view illustrating a state in which the vent membrane is mounted in the method for manufacturing the secondary battery according to the first embodiment of the present invention.

FIG. 7 is a cross-sectional view illustrating a state in which the vent membrane is mounted in the method for manufacturing the secondary battery according to the first embodiment of the present invention.

Referring to FIGS. 1 and 5 to 7, in the vent membrane mounting step (S20), the vent membrane 130 may be mounted on the discharge hole 123, which passes between the inside and outside, in the battery case 120.

Here, the vent membrane 130 may allow only a gas to pass through the discharge hole 123 of the battery case, but block a liquid. Thus, when an internal pressure of the battery case 120 reaches a predetermined pressure or more due to the generated internal gas, the internal gas may be discharged to the outside of the battery case 120 through the vent membrane 130 mounted on the discharge hole 123.

Also, the vent membrane mounting step (S20) may be performed, for example, before the case sealing step (S30) after the accommodation step (S10). Here, particularly, the vent membrane mounting step (S20) may be performed together during the de-gassing step or may be performed after the de-gassing step.

The vent membrane mounting step (S20) may comprise an insertion hole formation process of forming the insertion hole 124 in the battery case 120, a vent membrane positioning process of positioning the vent membrane 130 on the discharge hole 123 after inserting the vent membrane 130 into the battery case 120 through the insertion hole 124, and a vent membrane fixing process of fixing the vent membrane 130 to the battery case 120. In addition, the vent membrane mounting step (S20) may further comprise a discharge hole formation process of forming the discharge hole 123 in the battery case before the vent membrane positioning process after the insertion hole formation process.

Referring to FIG. 5, in the insertion hole formation process, the insertion hole 124 may be formed in a size that is capable of inserting the vent membrane 130 so that the vent membrane 130 is inserted into the battery case 120. Here, in the insertion hole formation process, the insertion hole 124 may be formed in the gas pocket part 122 of the battery case 120. Here, in the insertion hole formation process, the insertion hole 124 may be formed larger than a width of the vent membrane 130.

Referring to FIGS. 5 and 7, in the discharge hole formation process, the discharge hole 123 may be formed in the battery case 20 so as to be connected to the internal space of the battery case 120. Here, the discharge hole 123 may be formed to be disposed between the electrode assembly 110 and the outer circumferential surface of the battery case 120. Here, for example, in the discharge hole formation process, the discharge hole 123 may be formed in a portion of a lower case 127 between the electrode assembly 110 and the initial sealing part S1. Also, the discharge hole 123 may be formed at a position adjacent to the initial sealing part S1. In the discharge hole formation process, the discharge hole 123 may be formed in a circular shape.

Referring to FIG. 6, in the vent membrane positioning process, the vent membrane 130 may be disposed to cover the discharge hole 123. Here, in the vent membrane positioning process, the vent membrane 130 may be disposed on an inner surface of the battery case 120.

Referring to FIGS. 6 and 7, in the vent membrane fixing process, ultrasonic waves may be applied from the outside of the battery case 120 toward the vent membrane 130 to attach the vent membrane 130 to the battery case through ultrasonic welding. Here, in the vent membrane fixing process, an edge of the vent membrane 130 may be attached to an edge portion of the discharge hole 123 in the battery case 120.

Figure 8:
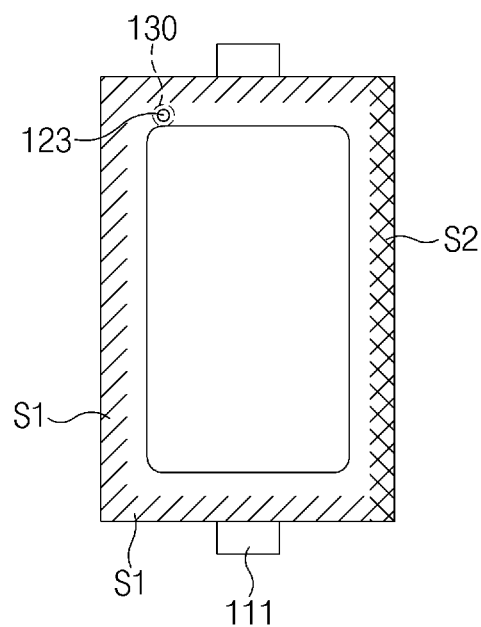
FIG. 8 is a plan view illustrating a case sealing step in the method for manufacturing the secondary battery according to the first embodiment of the present invention.

FIG. 8 is a plan view illustrating a case sealing step in the method for manufacturing the secondary battery according to the first embodiment of the present invention.

Referring to FIGS. 1 and 8, in the case sealing step (S30), after the vent membrane mounting step (S20), the battery case 120 may be sealed.

In addition, in the case sealing step (S30), for example, the gas pocket 122 may be cut and removed from the battery case 120, and the portion of the battery case 120, from which the gas pocket part 122 is removed, may be sealed to manufacture the secondary battery 100.

Also, a sealing part S2 may be formed on the portion of the battery case 120, from which the gas pocket part 122 is removed, to seal the inside of the battery case 120.

Referring to FIGS. 1, 7, and 8, in the method for manufacturing the secondary battery according to the first embodiment of the present invention, the vent membrane 130 may be mounted on the discharge hole 123 of the battery case 120 to allow only the gas to pass through the discharge hole 123 and block the liquid.

Thus, when an internal pressure of the battery case 120 reaches a predetermined pressure or more due to the generated internal gas, the internal gas may be discharged to the outside of the battery case 120 through the vent membrane 130 mounted on the discharge hole 123.

In addition, the vent membrane mounting step (S20) may be performed at the latter half of the method for manufacturing the secondary battery 100 after the accommodation step (S10) and the activation step to prevent the vent membrane 130 from being physically and chemically broken and damaged during the manufacturing process. As a result, it is possible to prevent a function of the vent membrane 130 from being deteriorated and to prevent manufacturing costs from increasing. Therefore, the vent membrane 130 is prevented from being deteriorated in function to prevent a large amount of air and moisture from being introduced into a cell, thereby significantly reducing the deterioration in function of the cell, the risk of explosion of the cell, and a defect rate of the cell.

Hereinafter, a method for manufacturing a secondary battery according to a second embodiment of the present invention will be described.

Figure 9:
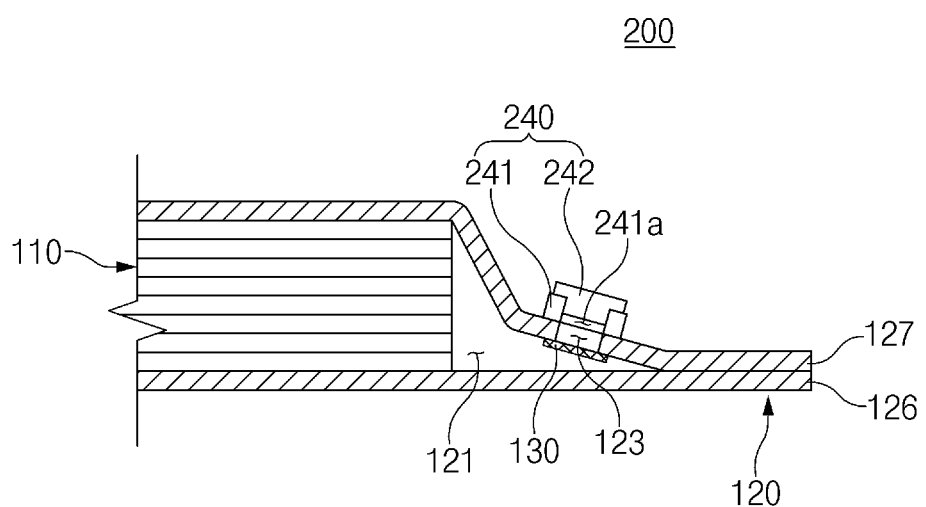
FIG. 9 is a plan view illustrating a state in which a vent membrane is mounted in a method for manufacturing a secondary battery according to a second embodiment of the present invention.
Figure 10:
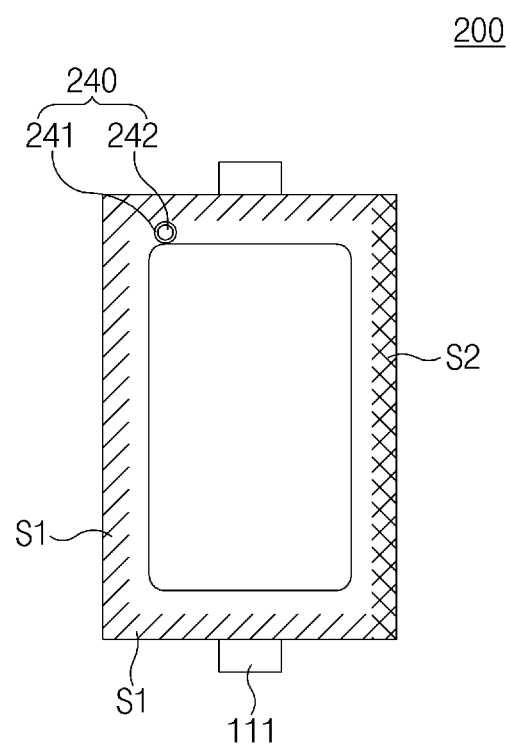
FIG. 10 is a cross-sectional view illustrating a case sealing step in the method for manufacturing the secondary battery according to the second embodiment of the present invention.

FIG. 9 is a plan view illustrating a state in which a vent membrane is mounted in a method for manufacturing a secondary battery according to a second embodiment of the present invention, and FIG. 10 is a cross-sectional view illustrating a case sealing step in the method for manufacturing the secondary battery according to the second embodiment of the present invention.

Referring to FIGS. 1, 9, and 10, a method for manufacturing a secondary battery according to a second embodiment of the present invention may comprise an accommodation step (S10) of accommodating an electrode assembly 110 in a battery case 120, a vent membrane mounting step (S20) of mounting a vent membrane 130 on a discharge hole 123 in the battery case 120, a cover part mounting step of mounting a cover part 240 on an outer portion of the battery case 120, and a case sealing step (S30) of sealing the battery case 120 to manufacture a secondary battery 200.

When compared to the method for manufacturing the secondary battery according to the foregoing first embodiment of the present invention, the method for manufacturing the secondary battery according to the second embodiment of the present invention may further comprise the cover part mounting step of mounting the cover part 240 on the battery case 120. Thus, contents of this embodiment, which are duplicated with those according to the first embodiment, will be omitted, and also, differences therebetween will be mainly described.

In the accommodation step (S10), the electrode assembly 110 may be accommodated in the accommodation part 121 of the battery case 120.

In the cover part mounting step, the cover part 240 may be mounted on an outer portion of the battery case 120 to cover the discharge hole 123 and the vent membrane 130.

Accordingly, the discharge hole 123 may be opened and closed through the cover part 240 to regulates movement of a fluid passing through the discharge hole 123 and the vent membrane 130.

Also, the cover part mounting step may be performed, for example, before the case sealing step (S30) after the vent membrane mounting step (S20).

Referring to FIGS. 1 and 10, in the case sealing step (S30), the battery case 120 may be sealed after the vent membrane mounting step (S20).

Referring to FIGS. 1, 9, and 10, in the method for manufacturing the secondary battery, which comprises the above-described constituents, according to a second embodiment of the present invention, a vent membrane 130 may be mounted on a discharge hole 123 of a battery case 120, and a cover part 240 may be mounted on an outer portion of the battery case 120 to cover the discharge hole 123 and the vent membrane 130, thereby controlling the opening and closing of the discharge hole 123.

Thus, it is possible to prevent a large amount of unnecessary gas such as nitrogen from being introduced into the battery case 120 by opening the cover part 240 only when necessary. That is, the cover part 240 may be opened only when an internal gas is excessively generated, and thus, it needs to discharge the internal gas through the vent membrane 130 provided on the discharge hole 123, but otherwise the discharge hole 123 may be closed through the cover part 240. Therefore, it is possible to prevent the gas, which is unnecessary or deteriorates the performance of the secondary battery 200, from being introduced into the secondary battery 200. Here, when the internal gas is excessively generated, the cover part 240 may be opened based on a criterion for determining that the battery case 120 swells over a certain range.

Hereinafter, the secondary battery according to the first embodiment of the present invention will be described.

Referring to FIGS. 7 and 8, the secondary battery 100 according to the first embodiment of the present invention comprises an electrode assembly 110, a battery case 120 in which the electrode assembly 110 is accommodated, and a discharge hole 123 passing between the inside and outside thereof is formed, and a vent membrane 130 mounted on the discharge hole 123 of the battery case 120.

The secondary battery 100 according to the first embodiment of the present invention relates to a secondary battery manufactured through the method for manufacturing the secondary battery according to the forgoing first embodiment. Thus, contents of this embodiment, which are duplicated with those according to the forgoing embodiment, will be omitted or briefly described, and also, differences therebetween will be mainly described.

In more detail, in the secondary battery 100 according to the first embodiment of the present invention, the electrode assembly 110 may be a power generating device that is chargeable and dischargeable and be assembled by alternately stacking electrodes and separators.

Here, the electrodes may comprise a positive electrode and a negative electrode. Thus, the positive electrode, the separator, and the negative electrode may be alternately disposed.

Also, the electrode assembly 110 may further comprise an electrode lead 111 connected to an end of the electrode. Here, the electrode assembly 110 may be electrically connected to an external device through the electrode lead 111.

A battery case 120 has an accommodation part 121 in which the electrode assembly 110 is accommodated, and a discharge hole 123 passing between the inside and outside of the battery case 120 is formed in the battery case 120.

The discharge hole 123 is formed in the battery case 120 so as to be connected to an internal space of the battery case 120 and may be disposed between the electrode assembly 110 and an outer circumferential surface of the battery case 120.

Also, the battery case 120 may comprise an upper case 126 and a lower case 127.

In addition, the battery case 120 may be made of a flexible material.

The vent membrane 130 may be mounted on the discharge hole 123 of the battery case 120 to allow only a gas to pass through the discharge hole 123, but block a liquid.

Thus, when an internal pressure of the battery case 120 reaches a predetermined pressure or more due to the generated internal gas, the internal gas may be discharged to the outside of the battery case 120 through the vent membrane 130 mounted on the discharge hole 123. Here, it is possible to prevent an electrolyte contained in the battery case 120 from leaking to the discharge hole 123 through the vent membrane 130 and prevent foreign substances such as an external liquid from being introduced into the battery case 120.

Also, the vent membrane 130 may be formed larger than a width of the discharge hole 123. Here, each of the discharge hole 123 and the vent membrane 130 may be formed, for example, in a circular shape.

Furthermore, the vent membrane 130 may comprise a porous membrane in which micropores are formed so that only a gas passes therethrough, but a liquid does not pass therethrough.

Here, each of the micropores may have a size, for example, less than 1/20,000 mm to block the liquid.

Here, each of the micropores may have a size, in particular, ranging of 1/40,000,000 mm to 1/20,000 mm. Thus, each of the micropores may have a size of 1/40,000,000 mm or more to allow the gas to pass therethrough and may have a size 1/20,000 mm or less to block the liquid. However, the size of each of the micropores is not necessarily limited thereto.

Here, the vent membrane 130 may be made of a hydrophobic material. Thus, the vent membrane 130 may have the size of the micropore and made of the hydrophobic material to allow the liquid to more well block the liquid without passing through the micropores.

In addition, the vent membrane 130 may comprise, for example, a Gore-tex material. Here, the vent membrane 130 may be a thin film or a film in which a large number of micropores are formed by heating and stretching a Teflon-based resin.

Hereinafter, a secondary battery according to a second embodiment of the present invention will be described.

Referring to FIGS. 9 and 10, a secondary battery 200 according to a second embodiment of the present invention comprises an electrode assembly 110, a battery case 120 in which the electrode assembly 110 is accommodated, and a discharge hole 123 passing through the inside and outside thereof is formed, and a vent membrane 130 mounted on the discharge hole 123 of the battery case 120.

The secondary battery 200 according to the second embodiment of the present invention is different from the secondary battery 100 according to the foregoing first embodiment of the present invention in that the secondary battery 200 further comprises a cover part 240 that regulates movement of a fluid passing through the vent membrane 130. Thus, contents of this embodiment, which are duplicated with those according to the forgoing embodiment, will be omitted or briefly described, and also, differences therebetween will be mainly described.

In more detail, in the secondary battery 200 according to the second embodiment of the present invention, the cover part 240 may be mounted on an outer portion of the battery case 120 to cover the discharge hole 123 and the vent membrane 130. Here, the cover part 240 may open and close the discharge hole 123 to regulate the movement of the fluid passing through the discharge hole 123 and the vent membrane 130.

Also, the cover part 240 may comprise a body 241 in which a through-hole 241a forming an extending passage together with the discharge hole 123 of the battery case 120 and a cap 242 provided on the body 241 to close and open the through-hole 241a.

The cap 242 may be, for example, press-fitted into the through-hole 241a of the body 241. Here, when the secondary battery 200 is used, if an internal pressure excessively increases due to a generation of an internal gas due to charging and discharging, coupling between the cap 242 and the body 241, which are press-fitted into the through-hole 241a of the body 241 at a predetermined pressure or more, may be released to open the discharge hole 123. Here, the vent membrane 130 may be continuously disposed on the discharge hole 123 to prevent foreign substances such as a liquid from being introduced into the secondary battery 200 even after the discharge hole 123 is opened, and thus, the secondary battery 200 may be used continuously.

In addition, the cap 242 may comprise, in particular, an elastic material.

Furthermore, the elastic material may comprise, in more particular, silicone. Thus, the cap 242 made of silicon, which is highly heat-resistant and insulating material, may not be damaged when the secondary battery 200 generates heat and also may be maintained in insulation to prevent electricity from flowing through the discharge holes 123.

In the secondary battery 200, which comprises the above-described constituents, according to the second embodiment of the present invention, the vent membrane 130 may be mounted on the discharge hole 123 of the battery case 120, and the cover part 240 may be mounted on the outer portion of the battery case 120 to cover the discharge hole 123 and the vent membrane 130, thereby controlling the opening and closing of the discharge hole 123.

Therefore, it is possible to prevent a large amount of unnecessary gas such as nitrogen from flowing into the battery case 120 by opening the cover part 240 only when necessary. That is, the cover part 240 may be opened only when an internal gas is discharged through the vent membrane 130 provided on the discharge hole 123, but otherwise the discharge hole 123 may be closed through the cover part 240. Therefore, it is possible to prevent the gas, which is deteriorates the performance of the secondary battery 200, from being introduced into the secondary battery 200.

While the present invention has been particularly shown and described with reference to the specific embodiments thereof, the method for manufacturing the secondary battery and the secondary battery according to the present invention are not limited thereto. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS 100, 200: Secondary battery
110: Electrode assembly
111: Electrode lead
120: Battery case
121: Accommodation part
122: Gas pocket part
123: Discharge hole
124: Insertion hole
125: De-gassing hole
126: Upper case
127: Lower case
S1: Initial sealing part
S2: Sealing part
130: Vent membrane
240: Cover part
241: Body
241a: Through-hole
242: Cap

The invention claimed is:

1. A method of manufacturing a secondary battery, the method comprising:
an accommodation step of accommodating an electrode assembly in an accommodation part of a battery case;
a vent membrane mounting step of mounting a vent membrane on a discharge hole formed in the battery case, the discharge hole extending between an inside of the battery case and an outside of the battery case, the vent membrane having a width larger than a width of the discharge hole, the vent membrane being attached to an inner surface of the battery case and covering the discharge hole; and
a case sealing step of sealing the battery case,
wherein the vent membrane is configured to allow a gas to pass through the discharge hole, and the vent membrane is configured to block a liquid from passing through the discharge hole, and
wherein the vent membrane mounting step is performed after the case sealing step.

2. The method of claim 1, wherein the vent membrane is configured such that, when an internal pressure of the battery case reaches or exceeds a predetermined pressure due to a gas generated within the inside of the battery case, the gas is discharged to the outside of the battery case through the vent membrane.

3. The method of claim 1, wherein the vent membrane mounting step comprises:
an insertion hole formation process of forming an insertion hole in the battery case;
a vent membrane positioning process of inserting the vent membrane into the battery case through the insertion hole and then positioning the vent membrane on the discharge hole; and
a vent membrane fixing process of fixing the vent membrane to the battery case.

4. The method of claim 3, wherein the vent membrane mounting step further comprises, before the vent membrane positioning process, a discharge hole formation process of forming the discharge hole in the battery case.

5. The method of claim 3, wherein, during the vent membrane fixing process, ultrasonic waves are applied to the vent membrane from the outside of the battery case, thereby attaching the vent membrane to the battery case through ultrasonic welding.

6. The method of claim 5, wherein, during the vent membrane fixing process, the vent membrane covers the discharge hole, and an edge of the vent membrane is attached to an edge portion of the discharge hole.

7. The method of claim 1, further comprising, after the vent membrane mounting step, a cover part mounting step of mounting a cover part on an outer portion of the battery case to cover the discharge hole and the vent membrane, wherein the cover part is configured to open and close the discharge hole to regulate movement of the gas passing through the discharge hole and the vent membrane.

8. A method of manufacturing a secondary battery, the method comprising:

an accommodation step of accommodating an electrode assembly in an accommodation part of a battery case;

a vent membrane mounting step of mounting a vent membrane on a discharge hole formed in the battery case, the discharge hole extending between an inside of the battery case and an outside of the battery case, the vent membrane configured to allow a gas to pass through the discharge hole, the vent membrane configured to block a liquid from passing through the discharge hole;

a case sealing step of sealing the battery case;

after the accommodation step, an activation step of applying power to the electrode assembly to activate the electrode assembly through charging and discharging; and a de-gassing step of discharging the gas generated through the activation step to the outside of the battery case, wherein the vent membrane mounting step is performed during the de-gassing step.

9. The method of claim 8, wherein the case sealing step includes sealing an outer circumferential surface of the battery case before the activation step and after the accommodation step.

10. The method of claim 8, wherein the vent membrane comprises a porous membrane in which micropores are formed.

* * * * *